US005293647A

United States Patent [19]

Mirmilshteyn et al.

[11] Patent Number: 5,293,647

[45] Date of Patent: Mar. 15, 1994

[54] MULTI-ADJUSTABLE HEADSET

[76] Inventors: Michael Mirmilshteyn, 818 N. La Jolla Ave.; Isaak Mirmilshteyn, 1224 N. Fairfax Ave., Apt. 8; Gennady Mirmilshteyn, 818 N. La Jolla Ave., all of Los Angeles, Calif. 90046

[21] Appl. No.: 746,860

[22] Filed: Aug. 19, 1991

[51] Int. Cl.[5] .......................... H04M 1/05; A42B 1/06

[52] U.S. Cl. ........................................ 2/209; 379/430; 381/183

[58] Field of Search .................... 2/209; 381/183, 187; 379/430; 455/351

[56] References Cited

U.S. PATENT DOCUMENTS 1,087,704 2/1914 Adams-Randall .................. 381/183
1,649,551 11/1927 Smith ................................. 381/183
3,682,268 8/1972 Gorike ............................ 381/187 X
4,597,469 7/1986 Nagashima ...................... 381/183 X
5,056,161 10/1991 Breen .............................. 381/183 X

FOREIGN PATENT DOCUMENTS 0439808 1/1927 Fed. Rep. of Germany ...... 381/183

*Primary Examiner*—Peter Nerbun

[57] ABSTRACT

A headset comprising: a headband, two ear cups, coupling means for rotatively coupling the ear cups to the headband for adjustably varying the location of each ear cup relatively to the headband and for simultaneously adjustably varying the pressure of each ear cup on the ears of the user. Securement means provide effective fixing of the ear cups in each chosen location. Moreover, the headset as a whole can be provided in a compact size for the purpose of carrying or keeping.

1 Claim, 3 Drawing Sheets

MULTI-ADJUSTABLE HEADSET

BACKGROUND OF THE INVENTION

This invention concerns in general a headset having different adjustment features. In particular the invention enables a user to make an adjustment of the location of each cup separately relatively to the headband and each ear of the user. Thereby the invention enables the user to choose a most comfortable location of the ear cups for the user, after wearing the headset on the head of the user. In the same time the invention enables the user to make adjustment of the pressure exerted by the ear cups on the user's head.

The invention is provided with coupling means for rotatively coupling the ear cups to the headband and securement means which provide effective fixing the ear cups in a chosen location.

The use of headsets with adjusting of some parameters has long been known.

In general, conventional headsets comprises headbands, which support ear cups usually constitute a C-clamp type device, comprising a spring, the tension of which applies pressure to the head of the user so as to hold the headset on the users head. This spring tension is usually somewhat adjustable by flexing the elements which comprises the headband.

A general problem of such headset is that a user experiences difficultly in choosing the most comfortable location of the ear cups and in precisely adjusting the amount of tension of the headset gripping his head. Often a user is painfully aware of such limitations of a conventional headset in that the pressure exerted on this head by the headset in too great or too little to be satisfactory. If the pressure is too great, discomfort, lack of concentration and even headaches may be caused.

However, if a user attempts to loosen the headset to relieve such excessive pressure, and only a coarse adjustment is present, the user is likely to decrease the pressure to the point where slippage of the headset can occur. It is possible for such slippage to cause loss of communication if the ear cup becomes separated from the user's ear.

Accordingly, there has been a long felt need for headsets which can be mass manufactured, but yet easily adjusted to fit an individual user, taking into account both the physical dimensions and personal tastes of those wearing such headsets.

Some attempts at solving this problem are known. For example, the U.S. Pat. No. 3,636,279 to Turner disclosed an headset of adjustable size including a pair of headphones each having a pair of parallel tracks formed therein and receiving a pair of electrical conductors associated with a headband assembly adjustable connecting the headphones. Such headset enables only the adjustment of the location of the headphones upwardly and downwardly respectively to the ears of user. However, there is no change in the headband pressure on the user's head and there is no change in the axial distance between the headphones.

The U.S. Pat. No. 4,189,788 to Schenke disclosed a headset comprises a headband and ear pieces. Each ear piece is supported to the headband by means of support member having a wedge shaped opening therein. A wedge is positioned within the support member opening and the headband is secured to the wedge. The wedge resiliently urges a fork attached to the ear piece against the support member thereby providing a slideable, frictional engagement. Such headset enables up and downwardly adjustment of the location of the ear pieces, but there are no means for adjusting the headband pressure on the users head.

The U.S. Pat. No. 4,727,585 comprises a band for a headset for adjustably varying the tension intermediate the downwardly depending ends of a spring headband includes a longitudinally extending spring member having an arcuate shape and radius less than the intermediate portion of the headband, that is disposed in the top of the intermediate portion of the headband at one end, a tension adjusting slider is disposed around the headband and the spring member for the longitudinal movement so that the tension intermediate the lower ends of headband is varied as the slider is repositioned. There is no suggestion of simultaneous adjustment of the headband pressure on the users head and the adjustment of the location of the ear cups relative to the ears of the user.

U.S. Pat. No. 4,783,822 to Cocoa, Charlson and Bussey discloses a multi-adjustable headband having separate coarse and fine adjustment of the axial distance between at least one ear piece element and a side support to vary the pressure exerted on the head of the user. However, there is no means for adjusting the upward and downward location of the ear piece element relative to the headband.

SUMMARY OF THE INVENTION

It is therefore, an object of the present invention to provide a multi-adjustable headset, which comprises a headband, a pair of ear cups, holders of the ear cups, means for articulately connecting each of the holders to a respective end of the headband comprising a coupling member, rotatively connected with the headband from one side and with the holder of an ear cup from the other side.

A further object of the invention is to provide a multi-adjustable headset which includes securement means for fixing the ear cups in a chosen position, comprising fixing means for fixing the coupling member relative to the head band and for fixing each holder of the ear cups relative to the coupling members.

A further object of the invention is to provide a multi-adjustable headset for adjusting the location of the ear cups relative to the headband and to the ears of the user and for simultaneously adjusting the tension of the ear cups on the ears.

A further object of the invention is to provide a multi-adjustable headset that can be provided in a compact size for the purpose of carrying or keeping.

A further object of the invention is to provide a multi-adjustable headset that is simple in construction, inexpensive to manufacture and relatively easy to use.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

DETAILED DESCRIPTION OF THE PREFERRED EMBODIMENTS

Figure 1:
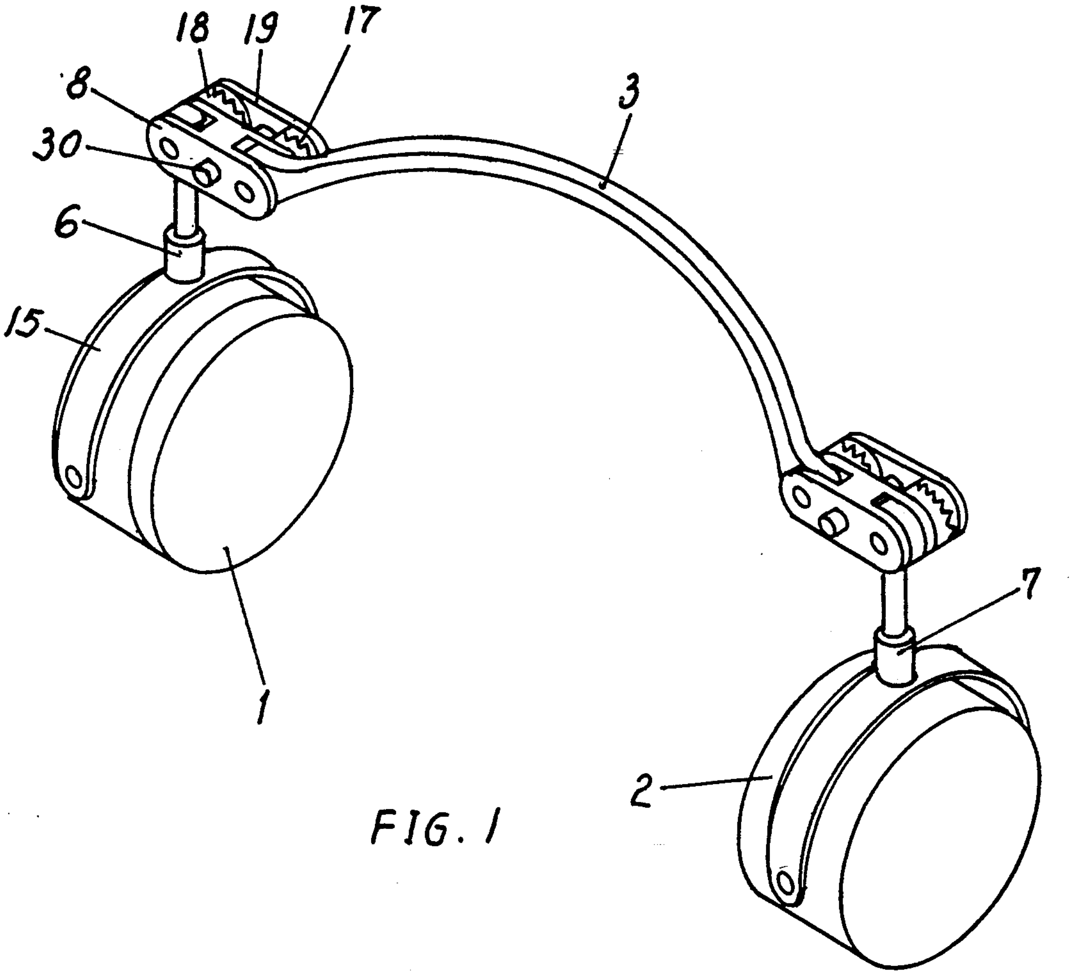
FIG. 1 is a perspective view of the headset in accordance with the present invention.
Figure 2:
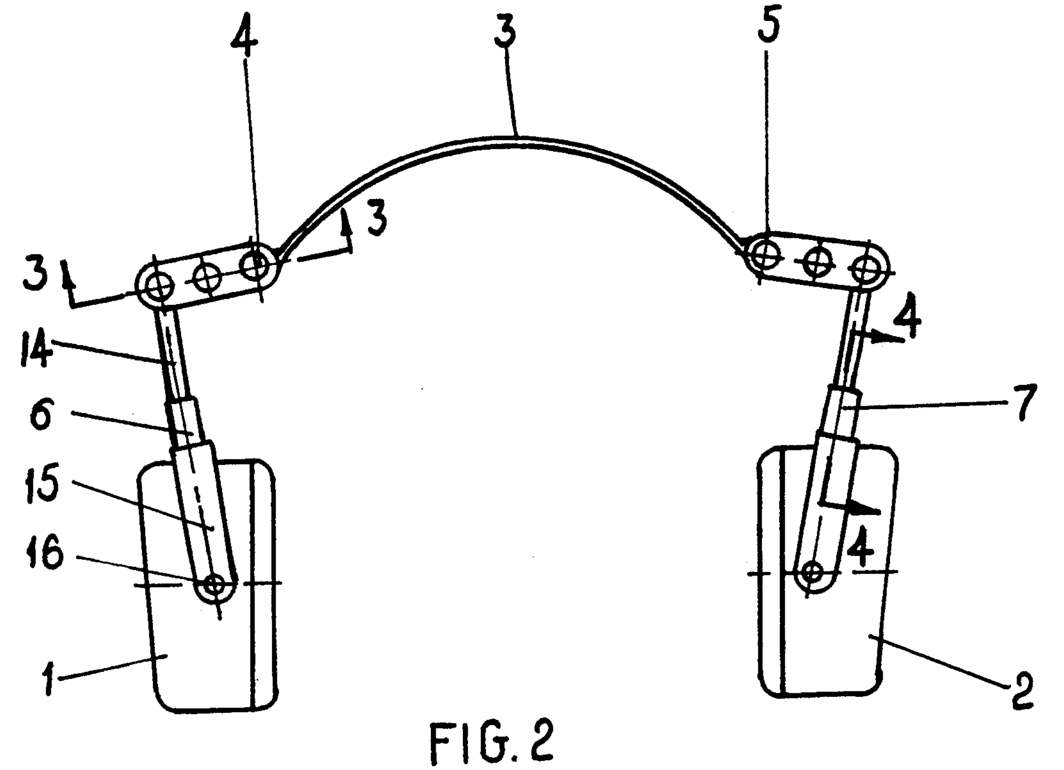
FIG. 2 is a frontal view of the headset in accordance with the present invention.
Figure 3:
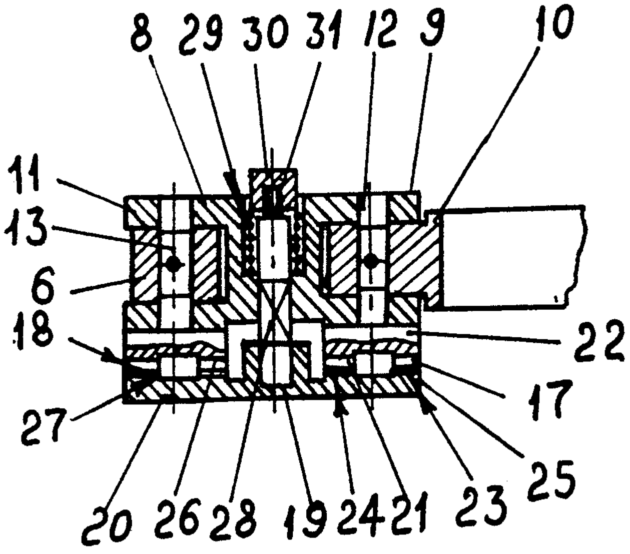
FIG. 3 is an enlarged fragmentary sectional view taken along the line 3—3 of FIG. 2.

A multi-adjustable headset of the invention hereinafter with reference to the drawings FIGS. 1, 2 and 3 shows an example of the headset according to the present invention. This headset is of an arrangement such that two ear cups 1 and 2 are coupled to a headband 3. The headband can be made from any proper material such as stainless steel, plastic material and so on and in accordance with this construction it is not necessary to use resilient deformable materials.

The ear cups 1 and 2 are coupled to the headband 3 by coupling means 4 and 5, which will be described later. These coupling means are arranged to that they allow the ear cups 1 and 2 to easily move vertically upward and downward respectively to the headband, change the axial distance between them by rotation around the vertical and horizontal axes of the ear cups, thereby insuring the headset to fit any type of user. The headset can be folded compactly.

Figure 4:
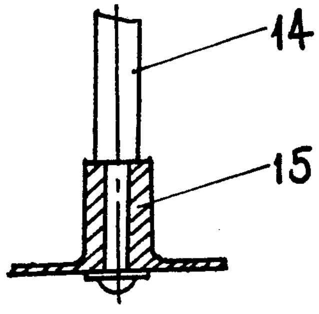
FIG. 4 is an enlarged fragmentary sectional view taken along the line 4—4 of FIG. 3.

The coupling means 4 and 5 and respectively the holders 6 and 7 of the ear cups are respectively substantially same in construction. Therefore only one coupling means, for example 4, and one holder, for example 6, will be described with reference to FIGS. 1, 2 and 3. The coupling means 4 comprises a coupling member 8, which at one end 9 is rotatively connected to the respective end 10 of the headband 3 and at the another end 11 the coupling member 8 is rotatively connected to the respective holder 6 of the ear cup 1. Both ends 9 and 11 of the coupling member 8 are fork-shaped having respective through- holes. Through these holes and the respective hole in the coupled end 10 of the headband 3 at one side and in the holder 6 of the ear cup 1 on the other side, pins 12 and 13, respectively, are engaged. Thus, the coupling member 8 can be rotated about the axes of the pins 12 and 13. The pins 12 and 13 are fixed motionless respectively to the end 10 of the headband 3 and to the end of the holder 6 of the ear cup 1. The holder 6 is rotatively coupled with the coupling member 8 and comprises a supporting member 14 and a U-shaped member 15, which is rotatable about the axis of the supporting member 14 as shown in FIG. 4. The ear cup 1 is also rotatable about the axes 16 of the U-shaped member 15.

Next, the securement means for fixing the ear cups will be discussed. The securement means comprises first fixing means 17, fixing the coupling member 8 relative to the headband 3, second fixing means 18, fixing the holder 6 of the ear cup 1 relative to the coupling member 8. A fixing member 19 comprises a bar 20. The first fixing means 17 comprises a tooth-type half-coupling 21 fastened to the cylindrical head 22 of the pin 12, which engages with the tooth 23 of the half-coupling 24 fastened to one end 25 of the bar 20. The second fixing means 18 are of the same construction as the first fixing means 17 and comprises half-couplings 26 and 27 disposed on the other end of the bar 20.

The axes of each half-coupling 21 and 26 fastened to the cylindrical heads of the pins 12 and 13 coincides with the axes of the respective half-couplings 24 and 27 fastened to the bar 20. A center pin 28 parallel to the axis of the half-couplings 21 and 24 is fastened to the bar 20 and is engaged into the hole in the center of the coupling member 8. The center pin 28 has only longitudinal movement along the axis without rotation about this axis.

The axis of the center pin 28 coincides with the axis of the hole in the coupling member. The center pin 28 is provided with a cylindrical spring 29. The axis of the spring 29 coincides with the axis of the center pin. The spring 29 is fixed and longitudinally compressed by a push-button 30 screwed on to the threaded top portion 31 of the center pin 28.

There can be other modifications of the fixing means for fixing the coupling members 8 relatively to the headband 3 and the holders 6 and 7 relatively to the coupling members 8 embodying the present invention: such as spring fixing means, fixing means comprising a ratchet-and-pawl mechanism and so on.

Next, the operation of the multi-adjustable headset is disclosed. The adjustment features may be used while the headset is being worn, thereby permitting a user to choose a comfort location of the ear cups respectively for each ear and optimize the amount of pressure on the ear of a user.

After pressing the push-button 30 it moves inside of the coupling member 8, compresses the spring 29 simultaneously disengaging the half-couplings 21, 24, 26, 27 and disconnecting the coupling member 8 from the headband 3 and the holder 6 of the ear cup 1 from the coupling member 8, allowing the coupling member 8 to rotate relative to the headband 3 and the holder 6 with the ear cup 1 to rotate relative to the coupling member 8.

Figure 5:
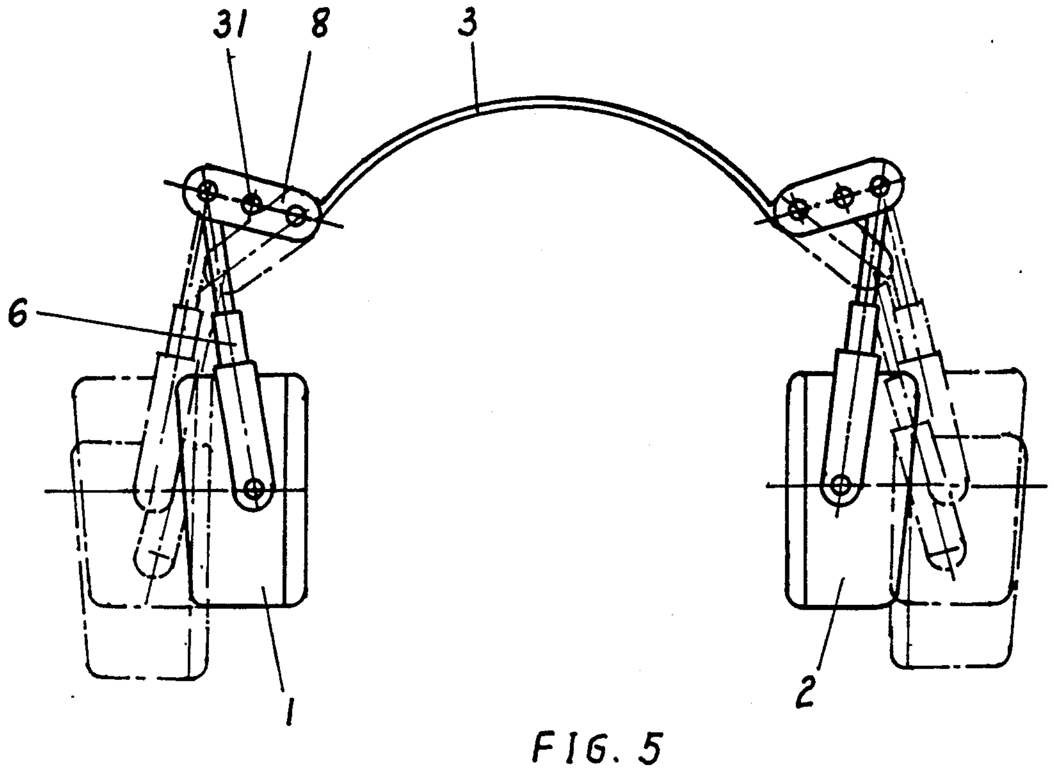
FIG. 5 is a schematic frontal view of the headset in accordance with the present invention in which different location of the ear cups thereof are presented.

After choosing the most comfortable position of the ear cup shown in FIG. 5, the push-button is released, the spring 29 engaged the half-couplings, fixing the coupling member 8 relative to the headband 3 and the holder 6 relative to the coupling member 8.

The same operation is performed simultaneously with the other ear cup 2.

Figure 6:
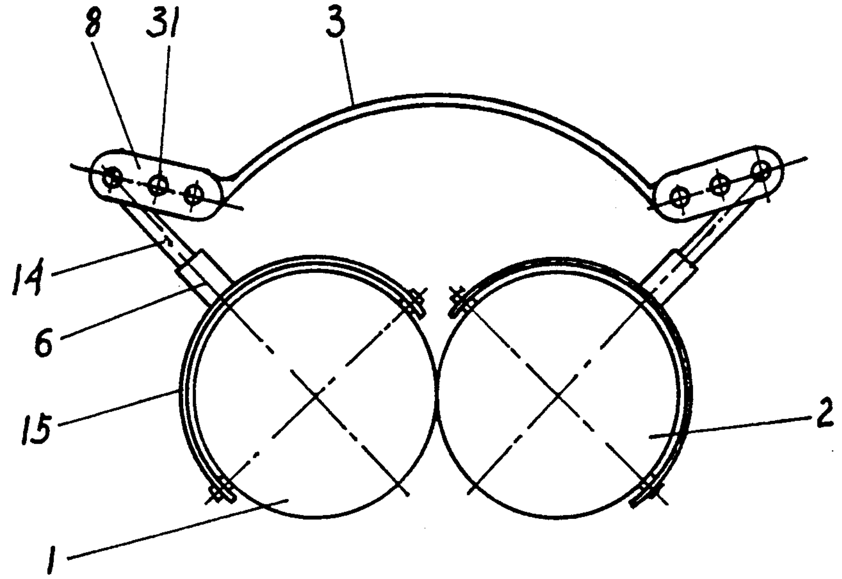
FIG. 6 is a schematic frontal view of the headset in accordance with the present invention in which the folded state thereof is presented.

Next, an operation to put the headset, which is in the state being ready for use, into the folded state for the purpose of carrying or keeping as shown in FIG. 6 is described. First, the push-button 30 is pressed, the half-couplings 21, 24, 26, 27 are disengaged simultaneously disconnecting the coupling member 8 from the headband 3 and the holder 6 of the ear cup 1 from the coupling member 8, allowing the coupling member 8 to rotate relative to the headband 3 and the holder 6 with the ear cup 1 to rotate relative to the coupling member 8. The U-shaped member 15 is rotated by substantially 90 degrees around the axis of the supporting member 14.

The same operation is performed simultaneously with the other ear cup 2.

It should be apparent to those skilled in the art that numerous variations can be made to the preferred embodiment disclosed herein without departing from the spirit of the invention which is defined in the following claim.

What is claimed is:

1. A multi-adjustable headset comprising: a headband, a pair of ear cups, one at each end of said headband, a pair of holders of the ear cups, coupling members with two hinges on each coupling member, which are rotatively connected with the respective end of said headband from one side of said each coupling member and with a holder of the ear cup from the other side of said each coupling member, for the adjustment of the axial distance between the ear cups with simultaneous adjustment of the vertical location of the ear cups with respect to said headband, securement means for simultaneously fixing the coupling members relative to the headband and the holders of the ear cups relative to the coupling members.

* * * * *